(12) United States Patent
Uchiyama et al.

(10) Patent No.: US 8,472,833 B2
(45) Date of Patent: Jun. 25, 2013

(54) POWER SUPPLY AND IMAGE FORMING APPARATUS

(75) Inventors: Nobuyuki Uchiyama, Mishima (JP); Minoru Hayasaki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 12/969,283

(22) Filed: Dec. 15, 2010

(65) Prior Publication Data

US 2011/0150521 A1    Jun. 23, 2011

(30) Foreign Application Priority Data

Dec. 21, 2009   (JP) ................................. 2009-288832
Nov. 19, 2010   (JP) ................................. 2010-259292

(51) Int. Cl.
   *G03G 15/00*          (2006.01)
(52) U.S. Cl.
   USPC ........................................................ 399/88
(58) Field of Classification Search
   USPC ........................................................ 399/88
   See application file for complete search history.

(56) References Cited

U.S. PATENT DOCUMENTS

| 6,674,658 | B2 | 1/2004 | Mao et al. |
| 7,254,353 | B2 | 8/2007 | Koyama et al. |
| 2009/0161396 | A1* | 6/2009 | Lin et al. ....................... 363/125 |
| 2010/0166449 | A1* | 7/2010 | Hong .............................. 399/88 |
| 2010/0172158 | A1* | 7/2010 | Sato et al. .................. 363/21.14 |
| 2010/0182808 | A1 | 7/2010 | Sato |

FOREIGN PATENT DOCUMENTS

| CN | 1381942 A | 11/2002 |
| CN | 1652040 A | 8/2005 |
| CN | 101471609 A | 7/2009 |
| JP | 7-115766 A | 5/1995 |
| JP | 11-055944 A | 2/1999 |

OTHER PUBLICATIONS translation of Shindengen (JP,07-115766, A listed in IDS, pub date May 2, 1995).*

* cited by examiner

*Primary Examiner* — Walter L Lindsay, Jr.
*Assistant Examiner* — Frederick Wenderoth
(74) *Attorney, Agent, or Firm* — Canon U.S.A., Inc. IP Division

(57) ABSTRACT

A synchronous rectification power supply controls driving of a switching unit in such a manner as to start the driving in response to rising of an output voltage at a secondary side of a transformer and to stop the driving after a predetermined time passed.

15 Claims, 9 Drawing Sheets

POWER SUPPLY AND IMAGE FORMING APPARATUS

BACKGROUND OF THE INVENTION

1. Field of the Invention

The present invention relates to a switching power supply of a synchronous rectification type and an image forming apparatus on which the power supply is mounted.

2. Description of the Related Art

There has been a demand to improve efficiency of an operation of a power supply in recent years in order to save power in electronic appliances. As one example of the power supply that realizes improvement of operation efficiency, a power supply is discussed in Japanese Patent Application Laid-Open No. 7-115766. Illustrated in FIG. 8 is one example of configuration of the conventional power supply. Referring to FIG. 8, the power supply includes a direct current power supply 1, a control circuit 2 controlling a metal oxide semiconductor field effect transistor (MOS-FET, hereinafter also referred to as FET) serving as a switching element, a field effect transistor (FET) 4 as a main switching element, a transformer 5, a FET 6 which is a second switching element, a smoothing capacitor 7, a load 8 to which a voltage is supplied, an output voltage detection circuit 9, a body diode 10 parasitic in the FET 6, a driving circuit 11 for the FET 6, and a current detection circuit 12 for the FET 6.

An input voltage from the direct current power supply 1 is accumulated as an excitation energy in a primary coil n1 of the transformer 5 by conducting (turning on) the FET 4 controlled by the control circuit 2 and the driving circuit 3. Meanwhile, the energy excited by the primary coil n1 of the transformer 5 when non-conducting (turning off) the FET 4 is converted to the energy in a secondary coil n2 to be supplied to the load via the body diode 10 and the current detection circuit 12. The current detection circuit 12 sends an on-signal to the driving circuit 11 upon detection of a flow of the current to turn on the FET 6. Further, the current detection circuit 12 determines that the current has finished flowing when the current flowing therein becomes lower than a predetermined value, and sends an off-signal to the driving circuit 12 to turn off the FET 6. A loss caused by the FET 6 is remarkably lower than a loss by a forward voltage of the body diode 10. Therefore, improvement in efficiency is attained by performing control in such a manner that the current to be supplied to the body diode 10 is switched to the FET 6. This method is called synchronous rectification, and the FET 6 is also called synchronous rectification FET.

However, the following issues have been found in the above-described conventional example. In the case of the above-described synchronous rectification, the circuit for detecting on/off of the synchronous rectification FET is provided in the configuration for the purpose of improving efficiency of the operation, and the detection circuit is complicated. Therefore, a circuit size is increased, which causes a cost increase. Also, in the case of detecting the current flowing in the secondary coil by the current transformer and performing the on/off control of the FET by the detected current, an amount of the current flowing in the secondary coil is small at the time of a light load (light load state), so that the current output from the current transformer is reduced to the very small current, thereby making it impossible to correctly control the on/off of the FET. When the on/off of the FET is not correctly controlled (driven), efficiency may be reduced or power consumption may be increased. The light load state means a standby state of awaiting an operation or a power saving mode (also called sleep mode) for reducing power consumption, which is a so-called default state in electric appliances. Since the default state is the state that occupies a considerable time in a day in an electronic device, the increase in power consumption and the loss caused by the on/off operation of the FET greatly influence a total power consumption of the electronic appliance.

SUMMARY OF THE INVENTION

According to an aspect of the present invention, a power supply includes a first switching unit configured to perform switching of a voltage input to a primary side of a transformer, a first control unit configured to control an output voltage at a secondary side of the transformer by controlling driving of the first switching unit, a second switching unit that is connected to the secondary side and driven corresponding to a voltage generated at the secondary side, and a second control unit for controlling the driving of the second switching unit such that the driving is started in response to rising of the output voltage at the secondary side and the driving is stopped after a predetermined time passed, in a low voltage output mode for reducing the output voltage at the secondary side.

According to an another aspect of the present invention, an image forming apparatus includes an image forming unit configured to form an image on a recording material, a control unit configured to control an operation of the image forming unit, a power supply unit for supplying a voltage to the control unit, wherein the power supply includes a first switching unit configured to perform switching of a voltage input to a primary side of a transformer, a first control unit configured to control an output voltage at a secondary side of the transformer by controlling driving of the first switching unit, a second switching unit that is connected to the secondary side and driven in response to a voltage generated at the secondary side, a second control unit for controlling the driving of the second switching unit such that the driving is started in response to rising of the output voltage at the secondary side and the driving is stopped after a predetermined time passed, in a low voltage output mode for reducing the output voltage at the secondary side.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. The exemplary embodiments should be understood as examples, and the technical scope of the present invention is not limited to the exemplary embodiments.

Figure 1:
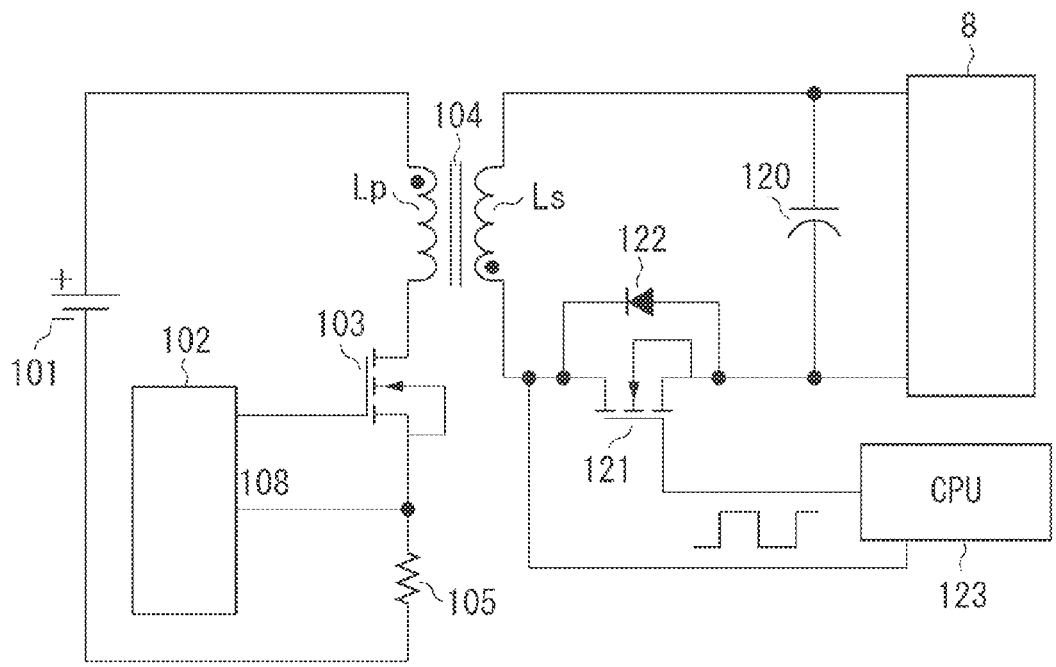
FIG. 1 is a diagram illustrating a power supply according to a first exemplary embodiment.
Figure 2:
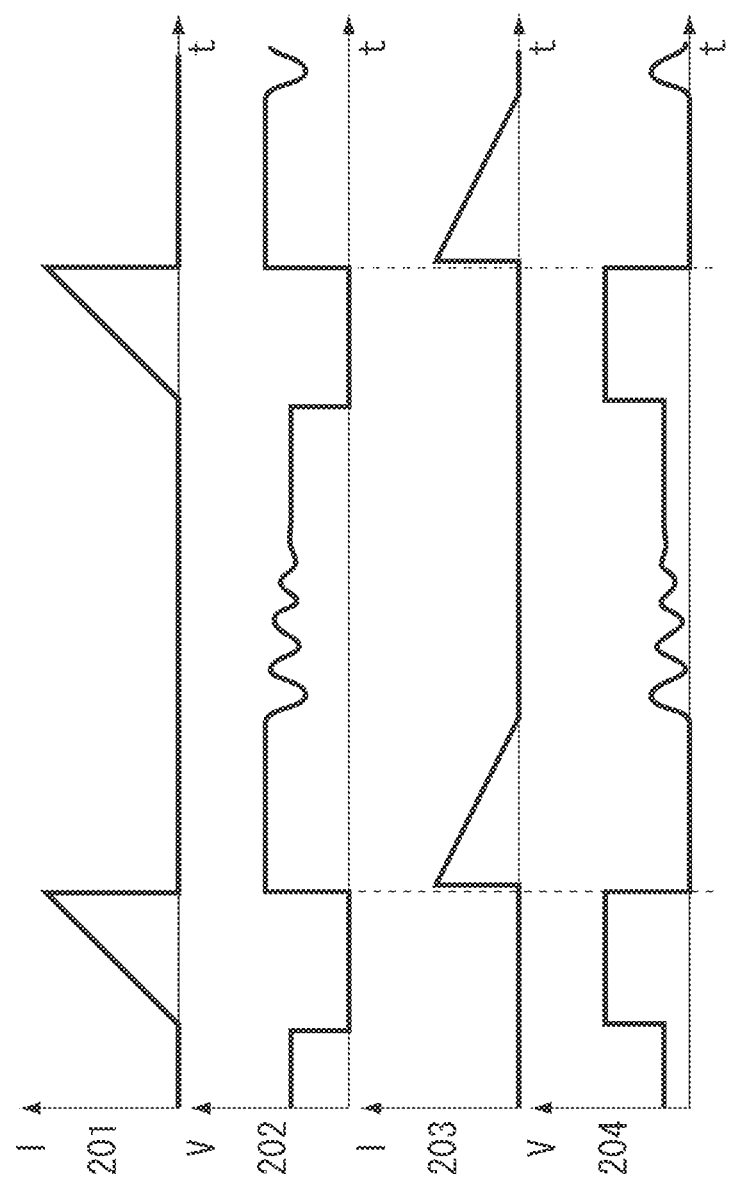
FIG. 2 is a diagram illustrating an operation waveform of the circuit according to the first exemplary embodiment.

Hereinafter, a first exemplary embodiment will be described. FIG. 1 is a diagram illustrating a power supply according to the first exemplary embodiment, and FIG. 2 is a diagram illustrating a part of an operation waveform of the circuit. Hereinafter, the first exemplary embodiment will be described in detail based on FIGS. 1 and 2.

A direct current voltage power supply 101 obtains a direct current voltage by subjecting an alternate current (AC) voltage that is supplied from a power point (commercial power supply) and subjected to full wave rectification by a diode bridge (not illustrated), and smoothing the voltage using a capacitor (not illustrated). A control integrated circuit (IC) 102 is a control unit that controls an on/off operation of a MOS-FET 103 (hereinafter referred to as FET) serving as a first switching element. A transformer 104 insulates a primary side from a secondary side and converts energy of the primary side to the secondary side. An inductance of a primary coil is represented by Lp, and an inductance of a secondary coil is represented by Ls. A resistance 105 for current detection detects a current of the FET 103, and a smoothing capacitor 120 is on the secondary side. A MOS-FET 12 (hereinafter referred to as FET) serves as a second switching element, which is a synchronous rectification FET for rectifying a voltage at the secondary side. A diode (also referred to as body diode) 122 likewise rectifies the secondary side voltage, and a control IC (central processing unit (CPU)) 123 controls an operation of an electronic appliance. A voltage is output from a load 8.

When activating the power supply, the control IC 102 starts (turns on) driving of the FET 103 with an activation circuit (not illustrated). When the FET 103 is turned on, a current flows in the primary side of the transformer 104 and the current detection resistance 105, and energy E1 represented by the following equation 1 is accumulated when a peak current flowing in the primary coil of the transformer 104 is Ip:

$$E1 = \tfrac{1}{2} Lp \times Ip^2 \quad \text{(Equation 1)}.$$

The peak current Ip is converted into a voltage by the current detection resistance and controlled to be a constant value by the control IC 102. Therefore, values of the energies accumulated in the transformer 104 are substantially the same even when the input voltage is varied. For example, when a voltage of 100 V system is input, since a slope of the peak current is raised (variation per unit time is large) when the input voltage is AC 85 V, a driving time (on-time) of the FET 103 is shortened. Meanwhile, since the slope of the current becomes gentle (variation per unit time is small) when the input voltage is AC 140 V, the on-time of the FET 103 is lengthened. As described above, even when the input voltages are varied, the current values are the same, and only the time periods during which the current flows are varied.

On the other hand, energy E2 accumulated in the secondary coil is represented by the following equation 2 when the peak current generated in the secondary coil is Is:

$$E2 = \tfrac{1}{2} Ls \times Is^2 \quad \text{(Equation 2)}.$$

In the case of a flyback power supply, since energy generated at a primary side of a transformer and energy to be converted to the secondary side are equal to each other, a current flowing in the secondary coil of the transformer 104 flows for a constant time irrespective of the input voltage. The first exemplary embodiment is based on a method for controlling an output based on the peak value of the current at the primary side of the transformer.

When the input voltages are constant, an on-time of the FET 103 is constant, and an on-time of the current at the secondary side of the transformer is also constant. Therefore, an off-time is varied to vary a frequency to correspond to a change in state (load is light/heavy) of the load 8. In other words, the time during which the current flows in the secondary side of the transformer is constant even when the state of the load is changed.

In the power supply of FIG. 1, when the output voltage to the load 8 is large, for example, 24 V (also termed heavy load state), control is performed in such a manner that a voltage at the output side of the electrolytic capacitor 120 on the secondary side is detected and fed back to the primary side of the transformer 104, so that the constant voltage (24 V) is output to a load to control driving of the FET 103. "When the output voltage is large", the electronic device executes an operation and this state is also termed a normal output mode.

Illustrated in FIG. 2 is an operation waveform when the output voltage is small, for example, 3.3 V (also referred to as light load state). Referring to FIG. 2, illustrated are a waveform 210 which is of a current supplied to the FET 103, a waveform 202 which is of a drain-source voltage, a waveform 203 which is of a current at the secondary side of the transformer, and a waveform 204 which is of a drain-source voltage of the synchronous rectification FET 121. Thus, falling of the drain-source voltage of the FET 121 and start of the current at the secondary side of the transformer occur at the same timing. The falling timing is detected by the control IC 123, and the IC 123 sets a gate terminal of the GET 121 to a high level to drive (to turn on) the FET 121.

More specifically, control is performed in such a manner that a voltage input to a cathode terminal of the diode 122 is detected by the IC 123 to determine a falling timing of the voltage, so that the FET 121 is driven at the detected timing.

Also, since the method of the first exemplary embodiment is based on the method for fixing the peak current, the off-time is fixed as described above, and the fixed time is previously stored as a timing for turning off the FET 121 in the control IC 123. After the time that is previously stored in the IC 123 passed (after the off-time elapses), the gate terminal of the FET 121 is set to a low level to turn off the FET 121. The off-time is a constant time previously set, which is set to 4 µs in the present exemplary embodiment. The off-time may be appropriately set depending on characteristics of a circuit and an element to be used.

It is assumed that the power to the IC 123 is supplied from a direct current/direct current (DC/DC) converter (not illustrated) that reduces the voltage from the secondary side of the transformer 104.

"When the output voltage is small (light load state)", the electronic device is in a standby state and does not execute any operation, which is also termed low voltage output mode.

As described above, in the method for fixing the peak current at the primary side of the transformer in the synchronous rectification power supply, the control is performed in such a manner that the falling of the output voltage of the secondary coil of the transformer is detected to start driving the synchronous rectification FET at the secondary side, and the driving of the FET is stopped after the previously stored time elapses. Thus, it is possible to correctly operate the synchronous rectification FET at the secondary side irrespective of the state (size) of the load.

Though the configuration of separately providing the rectification diode 122 and the FET 121 at the secondary side is described in the first exemplary embodiment, it is possible to use the body diode provided in the rectification FET.

Hereinafter, a second exemplary embodiment will be described. In the above-described first exemplary embodiment, the driving of synchronous rectification FET at the secondary side is controlled by detecting the falling of the output of the secondary coil of the transformer employing the method for fixing the peak current at the primary side of the transformer. The present exemplary embodiment discusses a method for suppressing a reduction in efficiency due to a fluctuation of inductance of the transformer in the configuration of the first example.

In the configuration described in the first exemplary embodiment, there is a possibility that a fluctuation in inductance at the primary side and the secondary side of the transformer or a fluctuation of the resistance which is the current detection circuit at the primary side, for example, causes a difference between the time stored in the control IC and the time during which the current flows in the FET 121 at the secondary side. Particularly, when the load is heavier (also referred to as heavier load), there is a possibility that the driving of the FET 121 at the secondary side of the transformer is continued after the current starts to flow in the primary side of the transformer. In such case, when the FET 6 at the primary side is turned on again, i.e. when the voltage is generated at a wind starting side of the secondary side coil, the driving of the FET 121 at the secondary side is continued. In such a state, a negative side of the electrolytic capacitor 120 at the secondary side is biased to a reverse direction, which may deteriorate the electrolytic capacitor 120 at the secondary side. Further, there is a possibility that efficiency of the power supply is reduced.

Figure 3:
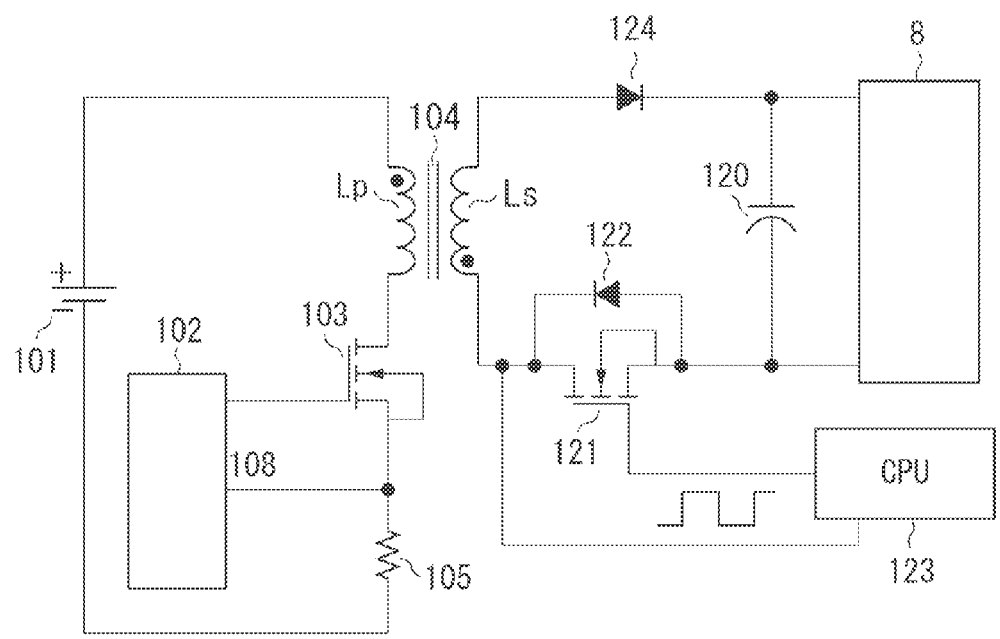
FIG. 3 is a diagram illustrating an operation waveform of the circuit according to a second exemplary embodiment.

Illustrated in FIG. 3 is a relationship between the current at the primary side and the current at the secondary side when a difference is caused between the stored time and an actual time. A current 301a is a current on the primary side of the transformer in the light load state, and a current 301b is a current on the secondary side of the transformer in the light load state. A region between dashed lines is the off-time. A current 302a is a current on the primary side of the transformer in the heavy load state, and a current 302b is a current on the secondary side of the transformer in the heavy load state. A period (filled triangular region) during which the current at the secondary side flows in the negative side is an overlapping period of the driving timings of the FET at the primary side and the FET at the secondary side of the transformer. When the overlapping period is generated, efficiency is reduced. Unlike the synchronous rectification, such overlapping period does not substantially exist in a diode rectification since the diode is automatically turned off when the rectification operation is finished (excluding reverse recovery of diode).

In the present exemplary embodiment, to prevent the above-described overlapping between the driving timings of the FET at the primary side and the FET at the secondary side of the transformer, control is performed in such a manner that diode rectification is performed in the heavy load state instead of performing the synchronous rectification operation, and the synchronous rectification operation is performed in the light load state in which the satisfactory off-time is ensured. Thus, it is possible to avoid the reduction in efficiency in the heavy load state. In the case of the light load state in which the satisfactory off-time is ensured, it is possible to prevent the above-described efficiency reduction since there is a time to spare until the FET at the primary side of the transformer is turned on even when a small difference is caused between the time stored in the control IC and the actual time for driving the FET at the secondary side of the transformer.

The "light load state in which the off-time is ensured" means a standby state of awaiting an operation in an electronic appliance (e.g. standby state, sleep state (power saving state), a state in which the output voltage is 3.3 V as described in the first exemplary embodiment). In contrast, the heavy load state (state in which the output voltage is 24 V as described in the first exemplary embodiment) in which the load is heavier than the light load state is established when the electronic appliance is in an operation state. Since the time for the standby state is longer than the time for the operation state (activated state) in an electronic appliance, it is important to reduce the power consumption during the standby state to reduce the total power consumption of the electronic appliance.

Figure 4:
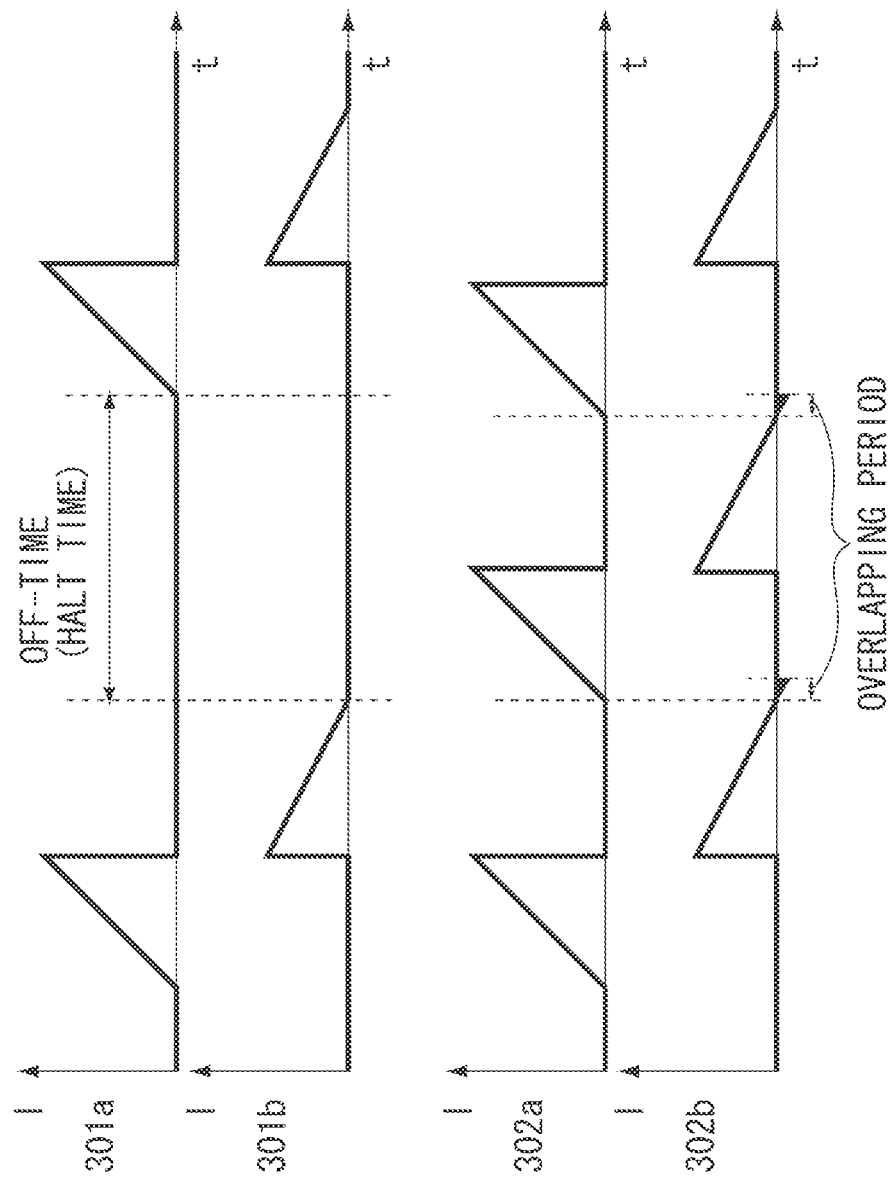
FIG. 4 is a diagram illustrating a power supply according to the second exemplary embodiment.

Hereinafter, the operation of the present exemplary embodiment will be described. A circuit configuration is substantially the same as the circuit configuration of the first exemplary embodiment (FIG. 1) but different in adding a rectification diode 124 at the secondary side as illustrated in FIG. 4. An operation different from the first exemplary embodiment is a driving operation of the FET 121 at the secondary side. As is obvious, an electronic appliance is in the heavy load state during the activated state and is in the light load state during the standby state where the appliance is at a stop and the sleep state where the power consumption of the appliance is reduced. In the present exemplary embodiment, the operation of the FET at the secondary side of the transformer is controlled depending on the state (mode) of the electronic appliance. More specifically, in the heavy load state, the FET 121 is not driven, and an operation is switched to a diode rectification performed by the diode 124.

Figure 5:
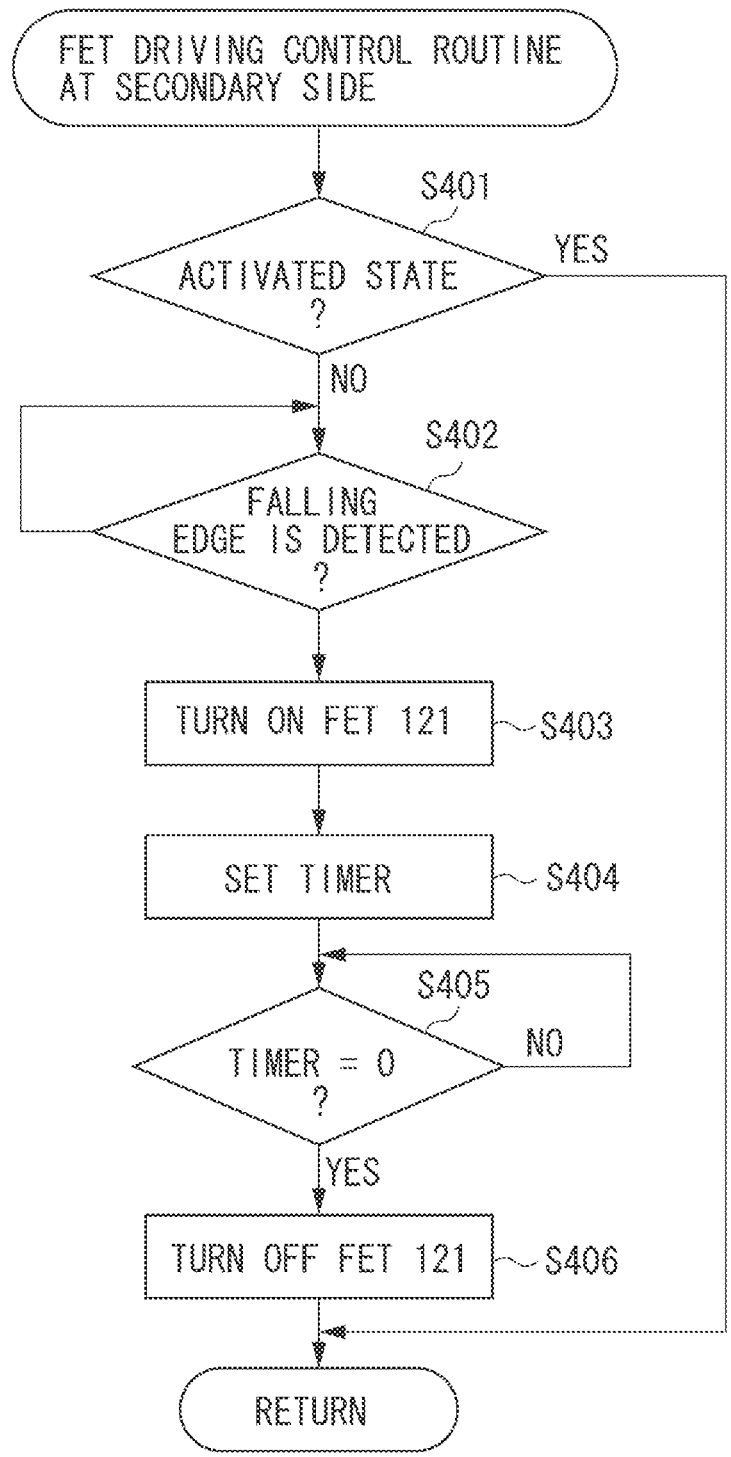
FIG. 5 is a flowchart illustrating an operation according to the second exemplary embodiment.

A specific operation will be described based on the flowchart of FIG. 5. In Step S401, it is detected whether an electronic appliance is in an activated state. For example, a state in which the electronic appliance starts an operation may be defined as the activated state, and the other states may be defined as a non-activated state. For example, it may be determined that the device is in the activated state when the operation is started. When the electronic device is in the activated state (Yes in S401), it is determined that the device is in the heavy load state, and the control IC 123 does not perform the operation (control) of the synchronous rectification FET 121, so that the rectification operation is performed by the diode 122. In short, the control IC 123 does not dive the FET 121. When the driving control of the FET 121 is not performed, the voltage at the secondary side is automatically rectified by the diode 124. In this case, a voltage with a positive polarity at the wind starting side of the secondary coil is generated during the period in which the current flows in the primary side of the transformer, but the voltage is blocked by the diode 124, so that the current does not flow to the load 8. Subsequently, a voltage with a positive polarity at a wind ending side of the secondary coil is generated when the current at the primary side finishes flowing, so that the current flows by a route from the load 8 (and electrolytic capacitor 120), through the diode 124, to the secondary coil of the transformer 104. Here, since the forward direction of the diode 124 and the direction of the current are identical with each other, the current is not blocked by the diode 124. In contrast, in the case of No in Step S401, i.e. when the electronic device is shifted to the standby state or sleep state, the standby state is kept until a falling edge of an output of the secondary coil is detected in Step S402. When the falling edge is detected (Yes in S402), the gate terminal of the FET 121 is set to a high level to turn on the FET 121 in Step S403. In step S404, a timer is set. Here, the set timer value is the same as or slightly smaller than the value of the time during which the current flows in the secondary side of the transformer as described in the first exemplary embodiment. The reason for setting the slightly smaller value is that it is possible that energy is wasted due to a reversed flow of the current from the smoothing capacitor 120 at the secondary side, which can be caused when the time during which the current actually flows in the secondary side becomes larger than the set time due to a fluctuation or the like. In Step S405, the standby state is kept until the timer reaches zero. In Step S406, the gate terminal of the FET 121 is set to a low level when the timer reaches zero, and the FET 121 is turned off.

As described above, in the heavy load state in which the electronic appliance is activated, the diode rectification, instead of the synchronous rectification, is employed, and the driving of the synchronous rectification FET is controlled by detecting the falling of the output voltage of the secondary coil when the electronic appliance is in the standby state or sleep state. Thus, it is possible to perform the driving control without the overlapping of the driving timings of the FET at the primary side and the FET at the secondary side, thereby enabling the synchronous rectification operation with suppressed power consumption.

In the case of adapting the present exemplary embodiment to a power supply to reduce an output voltage in the sleep state for the purpose of attaining lower power consumption in the sleep state, switching between the diode rectification and the synchronous rectification may be performed based on a switching signal from a power supply.

Hereinafter, the third exemplary embodiment will be described. In the above-described first and second exemplary embodiments, the FET at the secondary side of the transformer is controlled by the control unit (CPU) of the electronic appliance. In the present exemplary embodiment, the driving of the FET at the secondary side is controlled by using a driving circuit, not the control unit.

Figure 6:
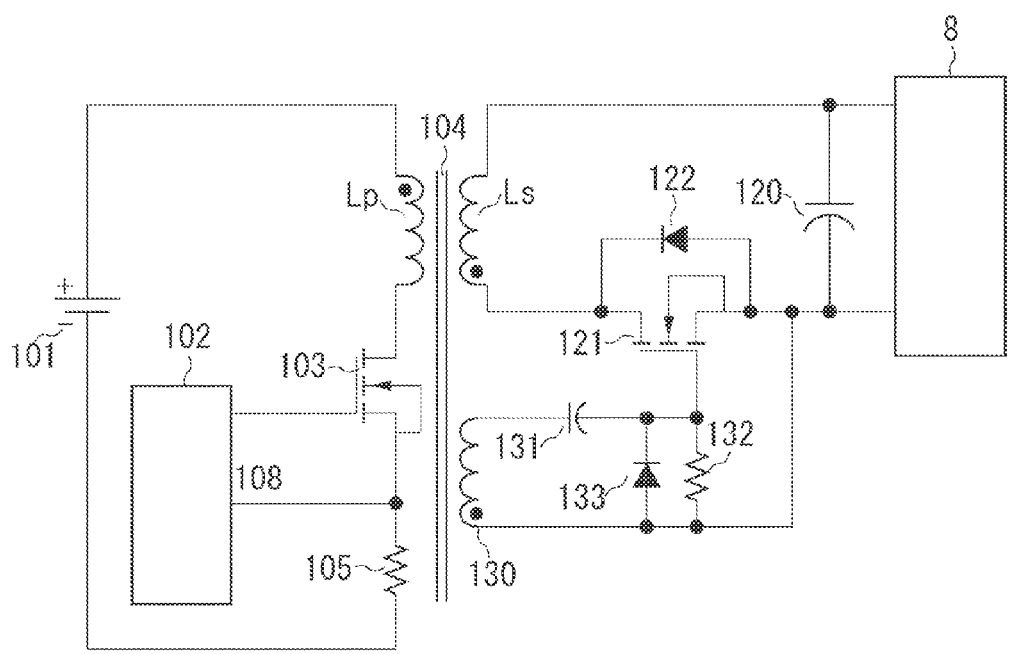
FIG. 6 is a diagram illustrating a power supply according to a third exemplary embodiment.

Hereinafter, the configuration of the present exemplary embodiment will be described based on a circuit diagram of FIG. 6 and an operation waveform of FIG. 7. In FIG. 6, configuration members same as those of the first exemplary embodiment (FIG. 1) are denoted by the same reference numerals, and descriptions thereof will not be repeated.

Referring to FIG. 6, an auxiliary coil 130 supplies a voltage to the gate terminal of the FET 121 at the secondary side of the transformer. A capacitor C131 has its one end connected to a wind ending side of the auxiliary coil 130 and the other end connected to the gate terminal of the FET 121 at the secondary side. A resistance 132 has its one end connected to the gate electrode of the FET 121 at the secondary side and the other end connected to a wind starting side of the auxiliary coil 130 and a ground side of the output at the secondary side. A diode 133 has its cathode side connected to the gate terminal of the FET 121 of the secondary side in parallel with the resistance 132. With such circuit configuration, a voltage that sets a polarity at the wind ending side of the auxiliary coil 130 to a positive polarity is generated for a certain period of time when the FET 103 at the primary side is turned off, so that voltage supply through the capacitor 131 to the gate terminal of the FET 121 at the secondary side starts. The capacitor 131 and the resistance 132 form a differential circuit, and the voltage supplied to the FET 121 at the secondary side is gradually damped. The diode 133 is connected to prevent the gate-source voltage of the FET 121 at the secondary side from exceeding a withstanding voltage.

Figure 7:
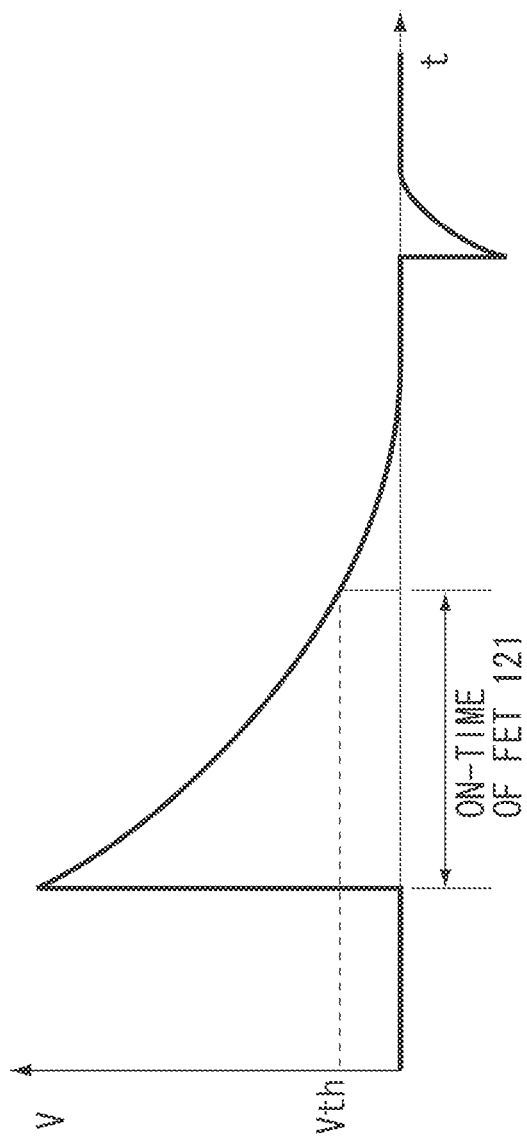
FIG. 7 is a diagram illustrating an operation waveform of the circuit according to the third exemplary embodiment.
Figure 8:
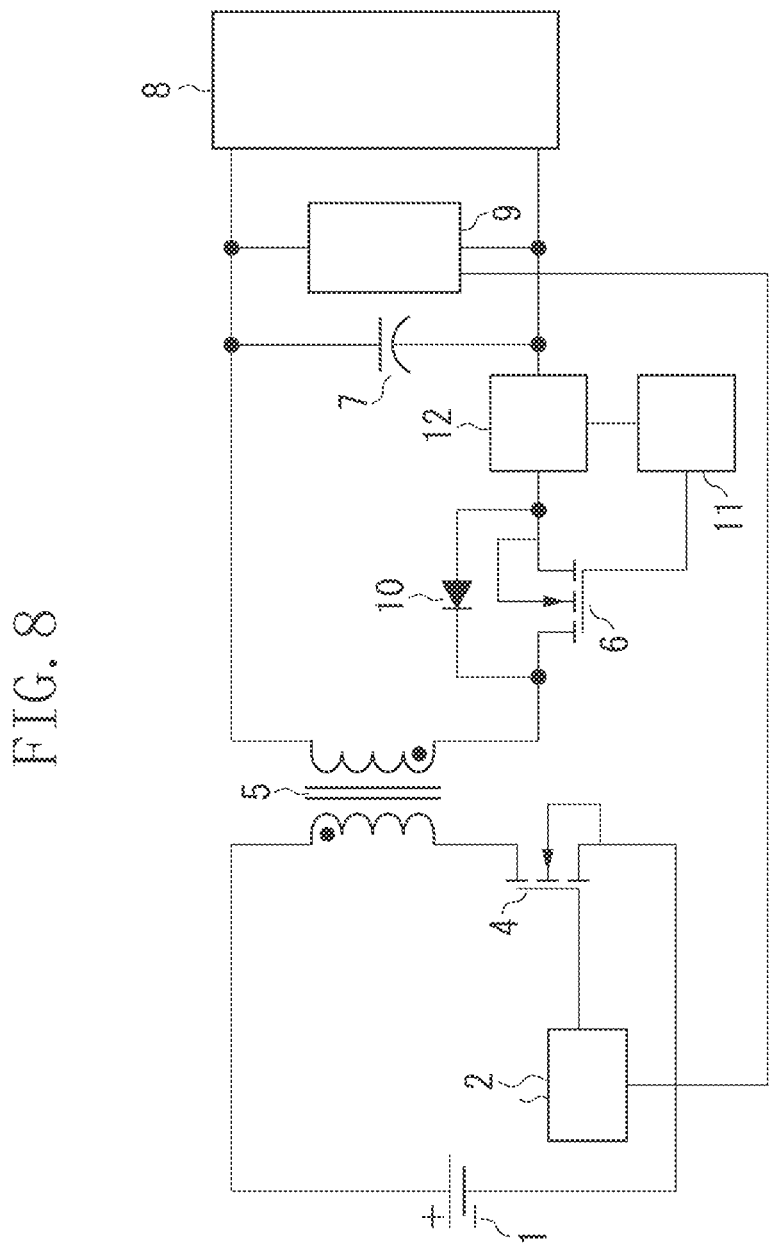
FIG. 8 is a diagram illustrating a conventional circuit.

Illustrated in FIG. 7 is a waveform of the voltage applied to the gate terminal of the FET 121. The vertical axis indicates a voltage value (V), and the horizontal axis indicates a time (t). The period at which a damping curve of the voltage fall below Vth which is an on-voltage of the FET 121 at the secondary side is the on-period of the FET 121 at the secondary side. Values of the capacitor 131 and the resistance 132 are adjusted to keep the on-period to a predetermined value. Thus, the synchronous rectification operation is enabled by keeping the on-period to the predetermined value.

As described above, the auxiliary coil is added to the transformer, and the output from the auxiliary coil is supplied to the gate terminal of the FET at the secondary side through the differential circuit formed of the capacitor and the resistance. Thus, it is possible to turn on the FET at the secondary side for the certain period of time, thereby realizing the stable and correct synchronous rectification operation as in the first exemplary embodiment.

In the case of performing the driving control of the synchronous rectification FET by forming the circuit by hardware as shown in the present exemplary embodiment, it is still possible to realize the operations same as that of the first and second exemplary embodiments. For example, it is possible to control the driving timings of the FET at the primary side and the FET at the secondary side in such a manner that the driving timings do not overlap with each other irrespective of a fluctuation of the elements by setting the timing at which the FET at the secondary side is turned off to a timing before the timing at which the current at the secondary side becomes zero and switching to the diode rectification just before the FET at the secondary side is turned off.

Also, it is possible to add the rectification diode and switch to the diode rectification at the heavy load state as in the configuration of the second exemplary embodiment.

Hereinafter, one example of the device to which the power supply of the first to third exemplary embodiments will be described based on FIGS. 9A and 9B. It is possible to use the current resonance power supply described in the first to third exemplary embodiments as a low voltage power supply in an image forming apparatus such as a laser beam printer, a copying machine, and a facsimile. It is possible to use the current resonance power supply for supplying power to a controller serving as a control unit in the image forming apparatus or as a power supply for supplying power to a motor serving as a driving unit of a feed roller for feeding a sheet.

Figure 9A:
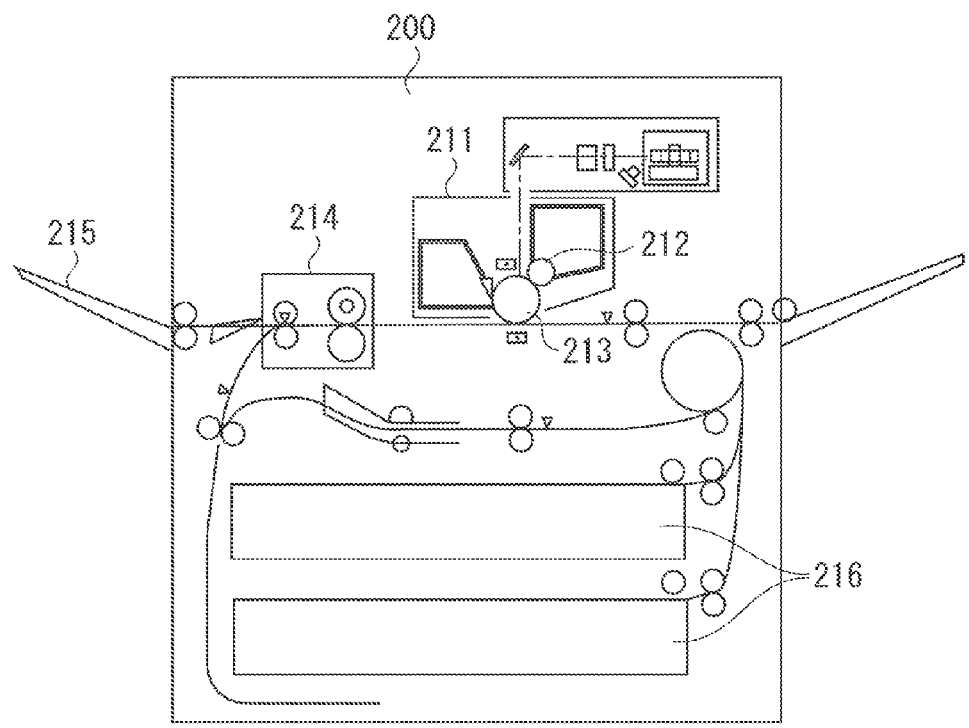
FIGS. 9A and 9B are diagrams illustrating one application example of the power supply of the present invention.
Figure 9B:
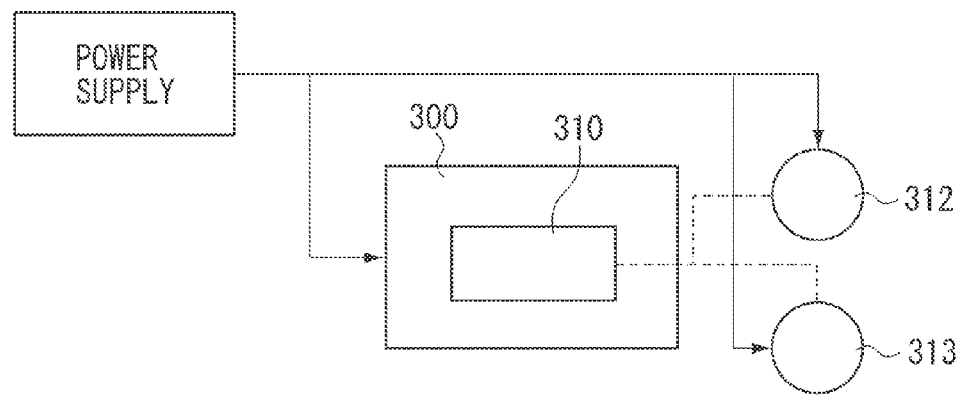

Illustrated in FIGS. 9A and 9B are schematic configurations of a laser beam printer which is one example of the image forming apparatus. The laser beam printer 200 includes a photosensitive drum 211 as an image carrier serving as an image forming unit 210 on which a latent image is formed and a developing unit 212 for developing the latent image formed on the photosensitive drum by using a toner. The toner image developed on the photosensitive drum 211 is transferred onto a sheet (not illustrated) serving as a recording medium fed from a cassette 216, and the toner image transferred onto the sheet is fixed by a fixing device 214, followed by discharge of the sheet to a tray 215. Illustrated in FIG. 9B are power supply lines from a power supply to a controller serving as a control unit and a motor serving as a driving unit of the image forming apparatus. The current resonance power supply is usable for supplying power to a controller 300 having a CPU 310 for controlling the image forming operation and as a low voltage power supply for supplying power to motors 312, 313 serving as driving units for the image formation. As the supply power, 3.3 V is supplied to the controller 300, and 24 V is supplied to the motor. The motor 312 is a motor for driving a feed roller for feeding the sheet, and the motor 313 is a motor for driving the fixing device 214.

In the case of using the current resonance power supply as the low voltage power supply of the image forming apparatus, the low voltage power supply is outputting 24 V to the motor during the image forming operation i.e. in the state of executing the image formation operation while the power supply is outputting 3.3 V to the controller during power saving time i.e. in the operation standby state.

The power supply described in the first to third exemplary embodiments are usable for low voltage power supply of other electronic appliances without limitation to the above-described image forming apparatus.

As described above, the aspects of embodiments enables, in a synchronous rectification switching power source, to reduce power consumption by reducing a circuit size with a simple circuit configuration and correctly execute synchronous rectification operation irrespective of a state of a load.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288832 filed Dec. 21, 2009 and No. 2010-259292 filed Nov. 19, 2010, which are hereby incorporated by reference herein in their entirety.

What is claimed is:

1. A power supply comprising:
a first switching unit configured to perform switching of a voltage input to a primary side of a transformer;
a first control unit configured to control an output voltage at a secondary side of the transformer by driving of the first switching unit;
a second switching unit that is connected to the secondary side and driven corresponding to a voltage generated at the secondary side; and
a second control unit configured to control driving operation of the second switching unit such that the second switching unit is turned on in response to falling of a voltage applied to the second switching unit and then the second switching unit is turned off when a predetermined time passes after the second switching unit is turned on, in a low voltage output state for reducing the output voltage at the secondary side.

2. The power supply according to claim 1, wherein the first switching unit is driven such that an on-period in response to the output voltage at the secondary side is maintained, in a normal output state for outputting a voltage higher than the low voltage output state.

3. The power supply according to claim 1, further comprising a diode at the secondary side, wherein
the second control unit stops the second switching unit in the normal output state so that the voltage at the secondary side is rectified by the diode.

4. The power supply according to claim 1, further comprising an auxiliary coil at the secondary side, wherein
a voltage from the auxiliary coil is supplied to the second control unit.

5. The power supply according to claim 1, wherein the second control unit includes a differential circuit including a capacitor and a resistance.

6. The power supply according to claim 1, wherein a timing for turning off the driving of the second switching unit is set to a timing before a current at the secondary side finishes flowing.

7. The power supply according to claim 1, wherein the second switching unit is a MOS-FET.

8. An image forming apparatus comprising:
an image forming unit configured to form an image on a recording material;
a control unit configured to control an operation of the image forming unit; and
a power supply unit for supplying a voltage to the control unit, wherein
the power supply includes:
a first switching unit configured to perform switching of a voltage input to a primary side of a transformer;
a first control unit configured to control an output voltage at a secondary side of the transformer by driving of the first switching unit;
a second switching unit that is connected to the secondary side and driven in response to a voltage generated at the secondary side; and
a second control unit configured to control driving operation of the second switching unit such that the second switching unit is turned on in response to falling of a voltage applied to the second switching unit and then the second switching unit is turned off when a predetermined time passes after the second switching unit is turned on, in a low voltage output state for reducing the output voltage at the secondary side.

9. The image forming apparatus according to claim 8, wherein the first switching unit is driven such that an on-period corresponding to the output voltage at the secondary side is maintained, in a normal output state for outputting a voltage higher than the low voltage output state.

10. The image forming apparatus according to claim 8, further comprising a diode at the secondary side, wherein
the second control unit stops the second switching unit in the normal output state so that the voltage at the secondary side is rectified by the diode.

11. The image forming apparatus according to claim 9, wherein the normal output state is an operation state in which an image is formed by the forming unit, and the low voltage output state is a power saving state or a standby state in which the image is formed by the forming unit.

12. The image forming apparatus according to claim 8, wherein the power supply further comprises an auxiliary coil at the secondary side, wherein
a voltage from the auxiliary coil is supplied to the second control unit.

13. The image forming apparatus according to claim 8, wherein the second control unit includes a differential circuit including a capacitor and a resistance.

14. The image forming apparatus according to claim 8, wherein a timing for turning off the driving of the second switching unit is set to a timing before a current at the secondary side finishes flowing.

15. The image forming apparatus according to claim 8, wherein the second switching unit is a MOS-FET.

* * * * *